United States Patent [19]

Brooks

[11] Patent Number: 5,434,371
[45] Date of Patent: Jul. 18, 1995

[54] HAND-HELD ELECTRONIC WRITING TOOL

[75] Inventor: Lamar E. Brooks, North Providence, R.I.

[73] Assignee: A.T. Cross Company, Lincoln, R.I.

[21] Appl. No.: 189,974

[22] Filed: Feb. 1, 1994

[51] Int. Cl.⁶ ............................................. G08C 21/00
[52] U.S. Cl. ........................................ 178/18; 345/179
[58] Field of Search ............................. 178/18, 19, 87; 345/157, 179, 174, 173; 382/13, 10, 2, 3

[56] References Cited

U.S. PATENT DOCUMENTS

| | | | |
|---|---|---|---|
| 5,151,950 | 9/1992 | Hullender | 382/13 |
| 5,159,321 | 10/1992 | Masaki et al. | |
| 5,247,137 | 9/1993 | Epperson | 178/18 |
| 5,303,312 | 4/1994 | Comerford et al. | 382/13 |

OTHER PUBLICATIONS

IBM Technical Disclosure Bulletin, vol. 16, No. 12, May 1974.

Primary Examiner—Stephen Chin
Assistant Examiner—Paul Loomis
Attorney, Agent, or Firm—Colucci & Umans

[57] ABSTRACT

A hand-held electronic writing implement comprises a writing tip for marking a surface and a pressure sensor located at the writing tip for emitting a pressure signal once the writing tip contacts the writing surface. An accelerometer sensor is also located at the writing tip for sensing the acceleration of the tip over the surface and emitting an acceleration signal based on the acceleration of the tip. The pressure signals and acceleration signals are transmitted to a processing circuit located within the implement. An analog-to-digital converter is used to convert the signals into a digital code which is recorded in a recording chip within the instrument. A power source is used to power the electronics of the implement. The writing implement is used in conjunction with a receiver capable of receiving digital information such as a computer having a translating package which translates the digital information in order to determine the original markings made by the writing tip on the writing surface. The translated markings are displayed on a display and are a reproduction on the original markings. The original markings are translated and displayed only when an initialization character, which is predetermined, is marked on the writing surface by the writing tip.

20 Claims, 5 Drawing Sheets

HAND-HELD ELECTRONIC WRITING TOOL

FIELD AND BACKGROUND OF THE INVENTION

The present invention relates, in general, to the field of digitizers, and in particular, to a new and useful hand-held, self-powered writing instrument which is capable of sensing and storing or transmitting information concerning its instantaneous motion and position.

Digitizer styluses are known and are generally used in conjunction with an electrified pallet.

U.S. Pat. No. 4,786,764 discloses a digitizer stylus with a contact switch that includes elements for determining the pressure exerted on the tablet by the stylus. Also see U.S. Pat. No. Re. 34,095, issued on original U.S. Pat. No. 4,786,764.

U.S. Pat. No. 4,217,649 discloses a digitizer which utilizes reflected light to locate the instantaneous position of a stylus. A transmitter on board the stylus transmits a pulse each time a light beam strikes the stylus, to act as a timing coordinator for determining the location of the stylus. Substantial apparatus outside the stylus itself is necessary to localize the position of the stylus.

U.S. Pat. No. 5,159,321 discloses a pen-type computer input unit which functions somewhat like a stylus-shaped mouse, where the rolling ball of the mouse is the rolling ink depositing ball of a ball point pen or a similar device. Signals are transmitted to a computer corresponding to rotation of the ball in the X and Y direction to provide coordinate information concerning the position and movement of the stylus.

IBM Technical Disclosure Bulletin, Volume 16, No. 12, May 1974 entitled "ACCELEROMETER PEN", discloses a writing instrument having perpendicularly effective accelerometers and a pressure sensor for recording writing patterns.

U.S. Pat. No. 4,063,409 discloses providing complex integrated circuits in small enclosures, such as a wristwatch, which provides a large memory capacity to accommodate multiple functions performed by the watch.

SUMMARY OF THE INVENTION

The present invention pertains to a self contained, hand-held tool that presents a new form of artistic expression. This expression is neither visual nor acoustic nor physical transfer, but similar in final presentation, to the original expression. The present invention also pertains to a method for creating, translating and recording this new artistic form.

The present invention is a system for creating artful expression, including handwritten messages, drawings and other dexterously produced forms which comprises a marking implement having a self contained means of recording the creation; a means of transferring the signal to another recording device, such as a computer; a means of decoding the signal and translating that signal to conventional computer language; and a means for displaying the creation.

The present invention permits the recording and collecting of dexterously produced motion in a hand-held instrument. The present invention utilizes a hand-held device having accelerometers for monitoring various directions such as the x, x', y, y' and z directions. The accelerations are located near the tip of the unit. A contact switch or sensor is also provided at the tip.

The present invention utilizes a processing circuit contained within the implement for processing the acceleration signals and contact signal. This circuit also utilizes an analog-to-digital converter to convert these signals into digital code. A recorder such as a chip storage device records the digital code. A power source is used to power the unit; and a plug (receptacle) downloads the accumulated digital data to a separate personal computer which receives the digital data. Conversion software is utilized to decode or translate the hand motions into recognizable patterns which are displayed on a screen display. The computer can also be used to edit the patterns.

The present invention provides an instrument and method to write messages, record the messages for later transfer to a computer file and manipulation of the file to edit the message. Applications for the present invention include creating graphic art, in which the artist records the creation inside the hand-held device for subsequent transfer into a computer file, or transmits the record immediately to a file.

The present invention functions by recording changes in velocity on a time continuum and discriminating when the instrument is in contact with or in very close proximity to the planar surface on which the user is working. Thus, the recorded velocity data is digitized so that it can be transmitted, broadcast or otherwise transferred into a computer file where the data is converted into a common computer language and edited, combined, synthesized transmitted or broadcast.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which multiple embodiments of the invention are illustrated.

DESCRIPTION OF THE PREFERRED EMBODIMENTS

Figure 1:
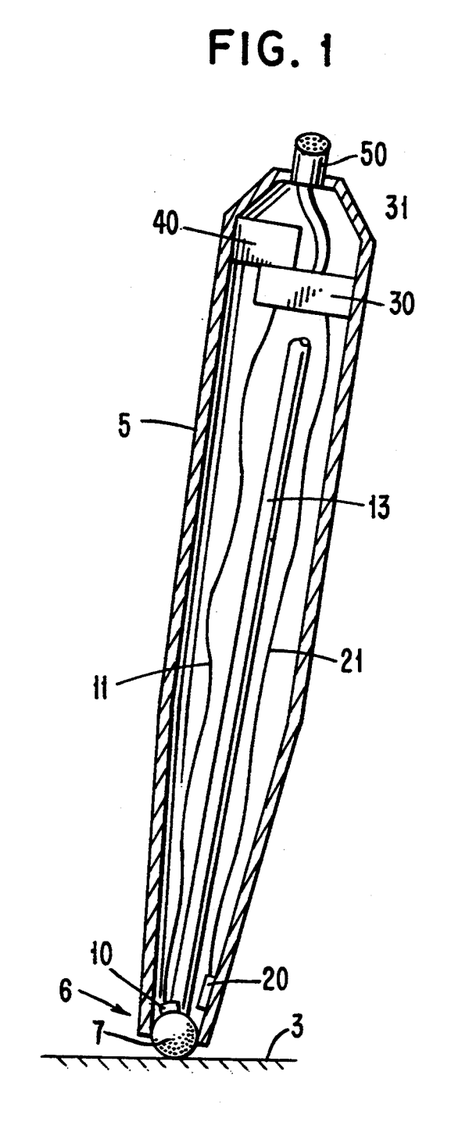
FIG. 1 is a sectional schematic view of a first embodiment of a marking implement according to the present invention.

The present invention pertains to, but is not limited to, the creation of artful expressions through the use of a hand-held marking, cutting or writing implement such as the implement illustrated in FIG. 1.

The implement is a hand-held device comprising a housing 5, which is not limited to any shape, and can be cylindrical, elliptical, trapezoidal or spiral.

The writing instrument according to the present invention is any type of hand-held instrument which marks a surface 3 such as paper, canvas, etc. The implement takes the form of a ball-point pen, pencil, rolling ball, fountain pen, felt-tip marker, stylus, gouger, paint brush, crayon, chisel, etc.

FIG. 1 illustrates the writing implement as a rolling ball ink writer utilizing ball 7 at tip 6 of the housing 5. An ink column 13 contains a source of ink which is provided to the ball 7 for leaving an ink marking on the paper 3.

A pressure sensor 10 is located on ball 7 at the tip 6 in order to sense when ball 7 is applied to and contacts the surface 3. Upon contacting ball 7 with surface 3, pressure sensor 10 emits a signal to an electronic signal processing circuit 30 through wire 11. Sensor 10 may also be a proximity sensor for activating and emitting a signal to the processing circuit 30 when ball 7 is located in close proximity to surface 3.

An acceleration sensor 20 or accelerometer assembly is also located at tip 6 for monitoring distance, time and changes in velocity for various directions or directional planes. Sensor 20 which utilizes accelerometers, described below, and emits an acceleration signal corresponding to the movement of tip 6 along surface 3. This signal is transmitted through wire 21 to the electronic signal processing circuit 30.

Figure 3:
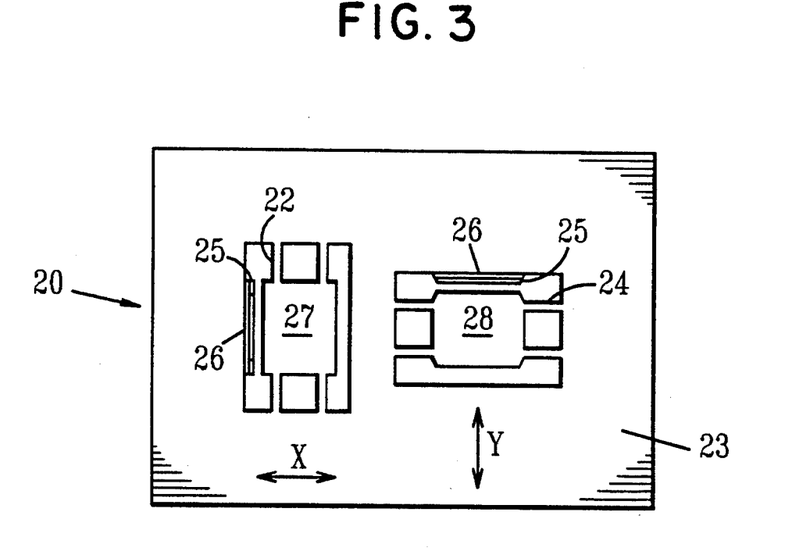
FIG. 3 is an enlarged view of first embodiment of an acceleration sensor according to the present invention.

As illustrated in FIG. 3, accelerometer sensor 20 comprises silicone substrate 23 having accelerometers located thereon. FIG. 3 shows only one embodiment of the sensor 20 for monitoring the movement of tip 6 in FIG. 1, in a first horizontal or X-direction and a second horizontal or Y-direction.

Sensor 20 comprises an X-parallel spring 22 which is displaced only in an X-axis direction or first horizontal direction, and a dispersable area 27 associated with the X-parallel spring 22. A Y-parallel spring 24 is displaced only in a Y-axis direction or second horizontal direction and is associated with displacement area 28. Electrodes 25 are coupled to displacement areas 27 and 28 respectively, through insulating areas 26.

Figure 4:
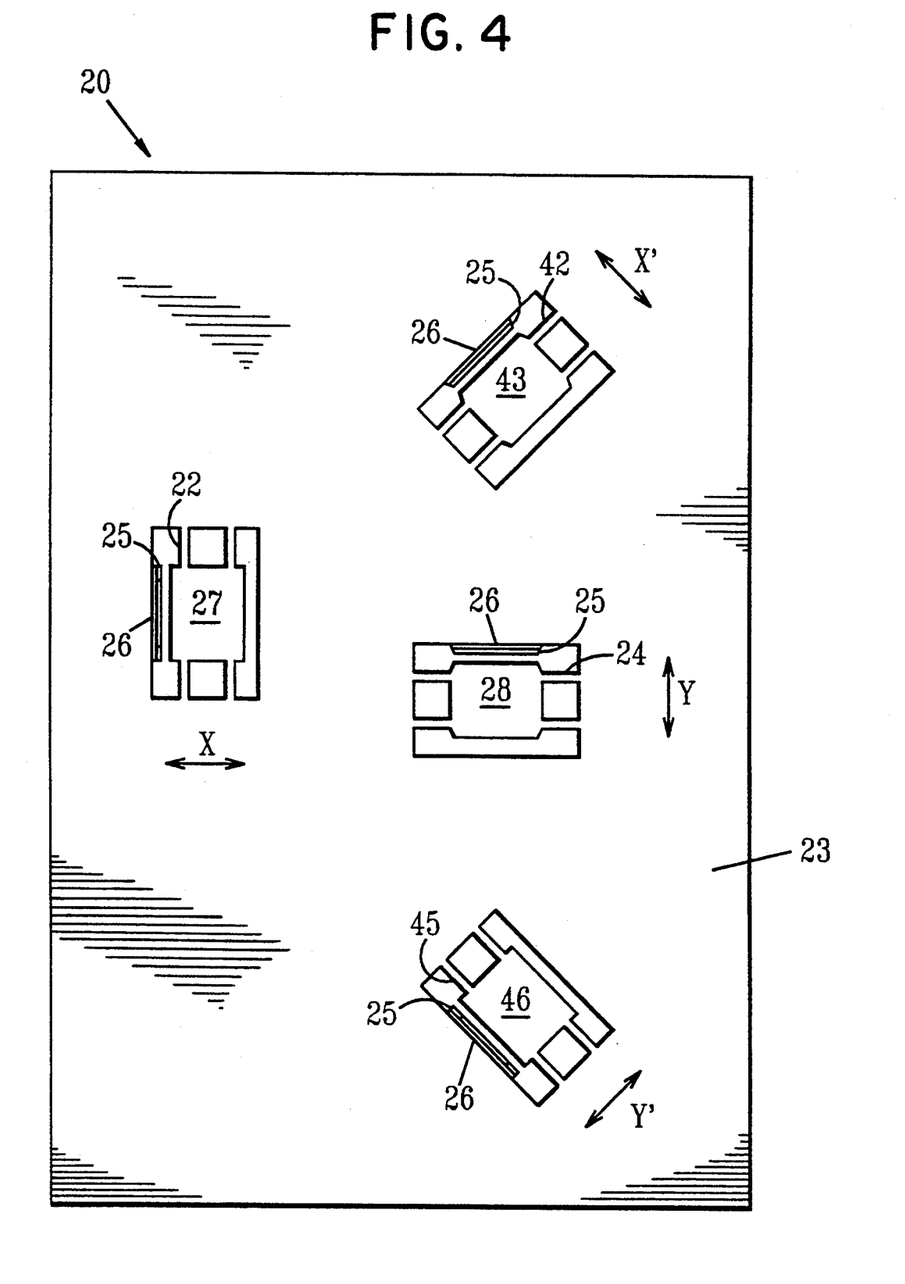
FIG. 4 is an enlarged view of a second embodiment of an acceleration sensor according to the present invention.

FIG. 4 illustrates a second embodiment of the accelerometer sensor 20 having a plurality of accelerometers on silicone substrate 23. An X'-spring can be displaced only in an X' direction which is a direction of 45° to the X-axis. An X' displacement area 43 is associated with the X'-parallel spring 42. A Y'-parallel spring 45 having displacement area 46 is oriented in a Y'-axis direction which is 45° to the Y-axis. FIG. 4 illustrates only one of various orientations of the accelerometers for the accelerator sensor 20.

Figure 5:
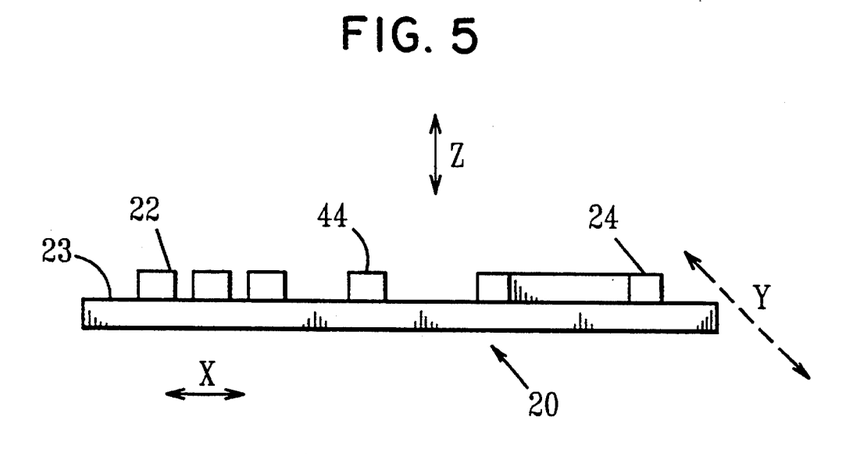
FIG. 5 is an enlarged side view of a third embodiment of an acceleration sensor according to the present invention.

FIG. 5 illustrates a third embodiment of the accelerometer sensor 20 having a Z-parallel spring 44 which can be displaced only in a Z-axis direction which is a direction perpendicular to both the X-axis and the Y-axis, e.g. vertically or along the axis of the implement.

As illustrated in FIGS. 3 and 4, electrodes 25 serve to detect displacements of displaceable regions of the accelerometers as changes in electrostatic capacitance. Displacements of the displaceable regions are caused by acceleration of the tip 6 along the respective X, Y, Z or other axis, and thus give full information on the instantaneous location of the tip at any point in time. Those skilled in the art of accelerometer design know of the existence of semiconductor based accelerometers of very small size which at the same time are very accurate and fast acting, so that the movement and location of the tip 6 at any time can be reduced to an electronic analog signal which can later be digitized and stored, preferably on-board the implement in accordance with the present invention. This stored digital information can thereafter be used with appropriate software to reproduce the pattern of movement, and thus the writing, cutting or marking pattern through which the tip 6 was moved. For example, the pattern taken by the tip during the writing of a person's signature can be accurately reduced to digital information.

Figure 6:
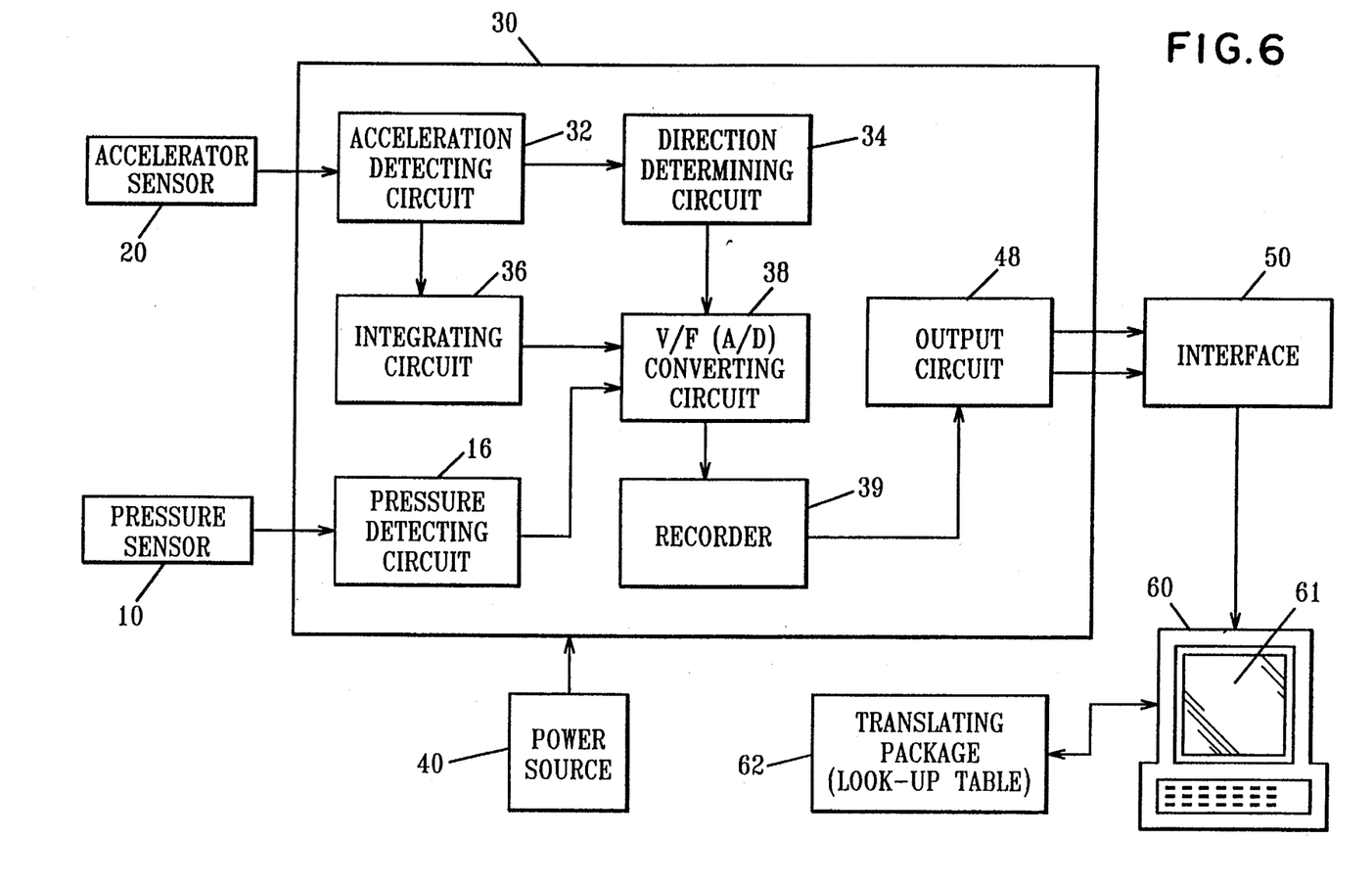
FIG. 6 is a schematic block diagram of the signal processing for the present invention.

FIG. 6 illustrates the signal processing for the present invention which utilizes an electronic signal processing circuit 30 which receives the movement or acceleration signals from accelerator sensor 20 and the contact or pressure signal from the pressor sensor 10.

The signal processing circuit 30 utilizes an acceleration detecting circuit 32 for receiving the acceleration signals from sensor 20. A direction determining circuit 34 interprets direction information from the detection circuit 32. Integrating circuit 36 is utilized to calculate distance information provided by acceleration circuit 32, as a function of acceleration and time.

The pressure or contact signal is provided by pressure sensor 10 to pressure detecting circuit 16 which signals the presence or contact of the ball 7 with surface 3 and provides this information to an analog-to-digital converter circuit 38. Direction information from direction circuit 34 and distance information from integrating circuit 36 are also provided to the analog-to-digital converter 38 (A/D) which is used to digitize the pattern of movement of tip 6.

The A/D converter 38 converts the information received into a digital code. A recorder or memory 39 such as an eight-bit storage chip is used to record the digital information from the A/D converter 38 prior to being transferred to an output circuit 48 which transmits this digital information to a receiver 60, over an interface 50.

Receiver 60 is any type of receiving device that receives digital coded information such as a microcomputer, mini-computer, mainframe computer or workstation with a compatible receiving port. A translating software package having a look-up table or pattern recognition program, represented at 62, is utilized by the receiver 60 for receiving the digital information from output circuit 48. Translating package 62 translates or interprets the digital code from receiver 60 in order to determine and imitate the original markings made to the surface 3 by the writing implement.

Figure 2:
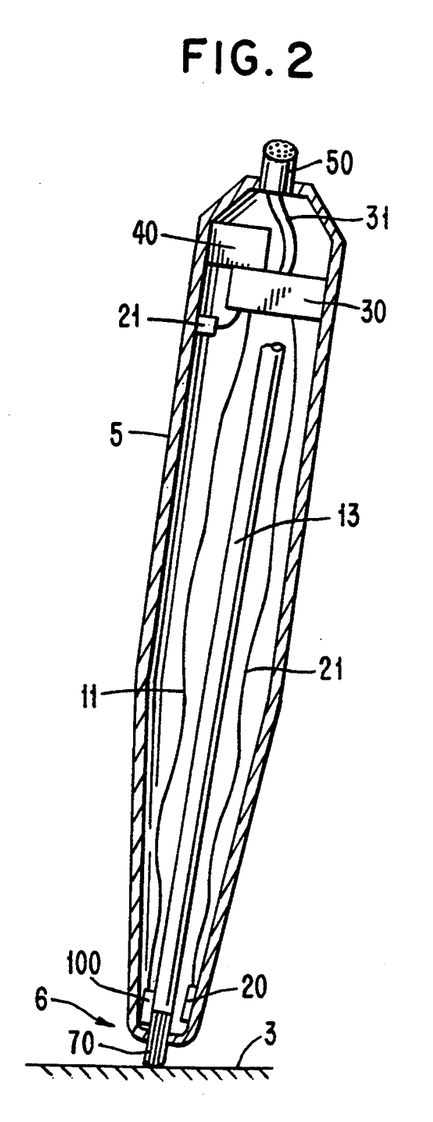
FIG. 2 is a sectional schematic view of a second embodiment of a marking implement according to the present invention.

As shown in FIGS. 1-2 and 6, a power source 40, such as a button battery, is operatively connected with the electronic signal processing circuit 30 for powering the electronics of the implement.

Wire 31 is utilized to transmit the digital code information from the electronic signal processing circuit 30 to the interface 50.

FIG. 6 schematically illustrates interface 50 connecting output circuit 48 and receiver 60 for providing a proper interface for transmitting the digital data from the electronic signal processing circuit 30. Interface 50 represents any suitable plug/receptacle combination with or without a connecting wire for transmitting from output circuit 48 to the receiver 60.

The present invention allows for recorder 39 to record all digital code information pertaining to the movement, direction, distance and time of the writing tip 6 which allows for the implement to be utilized separately from receiver 60. By utilizing a proper interface 50, the recorded information stored in recording chip 39 can be downloaded later into receiver 60 by direct connection. Alternatively, the writing implement can be connected to the receiver 60 by utilizing a connection wire (as shown at 50) having one receptacle plugged into output circuit 48 of the writing implement and the opposite end of wire 50 plugged into the receiver 60. This allows for an immediate transmission of the digital data while the writing implement is in use, instead of the delayed input as described above.

Additionally, another embodiment of the present invention allows for the digital code information to be transmitted from output circuit 48 by a radio frequency interface (also schematically illustrated by 50) to receiver 60 when receiver 60 is provided with radio frequency receiving capability.

Receiver 60 also includes a display terminal 61 for displaying the image translated by the translation package 62. This translated image can include text, signatures, graphic artwork, etchings, calligraphy or designs made by the writing implement.

Figure 7:
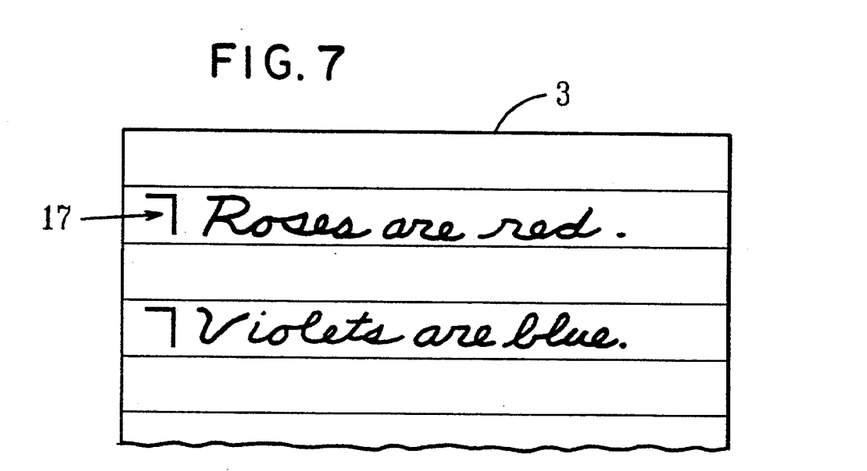
FIG. 7 is a view illustrating a first embodiment of an initializing character used in conjunction with the present invention.
Figure 8:
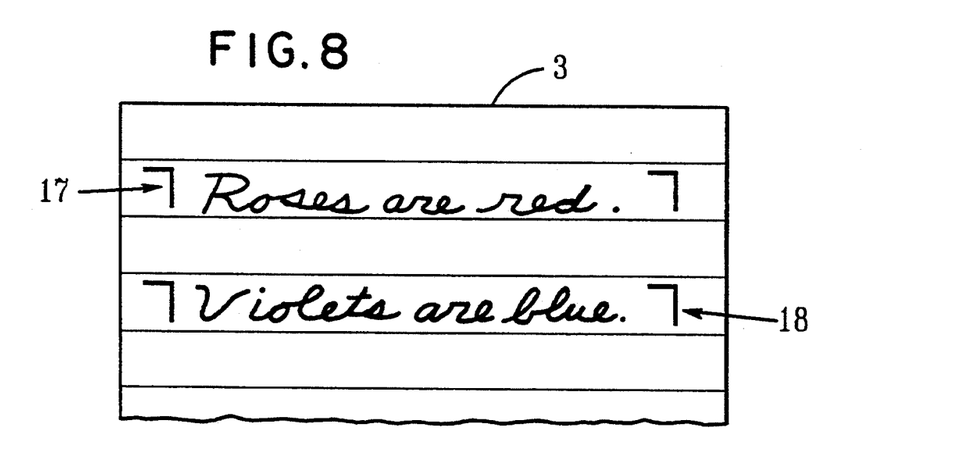
FIG. 8 is a view illustrating a second embodiment of an initializing character used in conjunction with the present invention.
Figure 9:
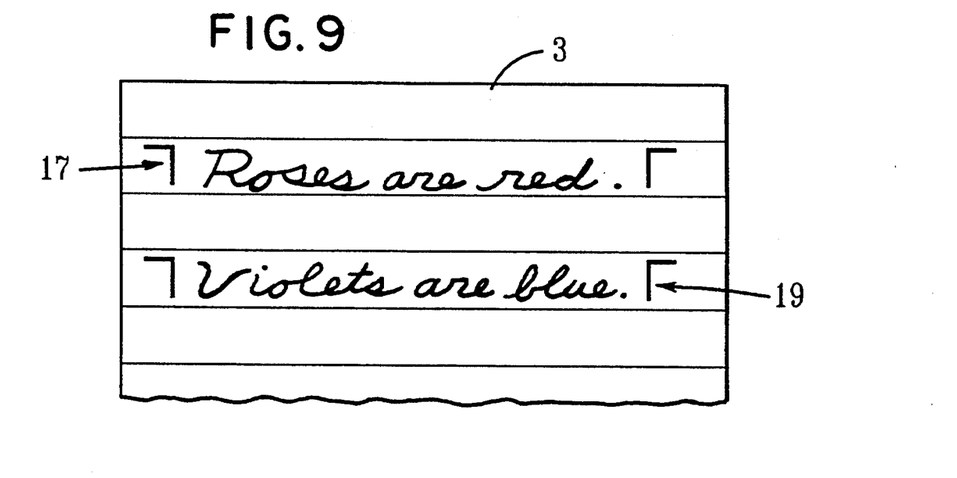
FIG. 9 is a view illustrating a third embodiment of an initializing character used in conjunction with the present invention.

As illustrated in FIGS. 7-9, one key feature of the present invention includes an initialization character 17 which is used to initialize the hand-held implement prior to recording the marking, drawing or movement about writing surface 3. Initialization character 17 is a defined character reserved in translating package 62 and/or in recorder 39, which alerts receiver 60 that the markings or pattern made on surface 3 need to be displayed on a receiver display 61, or recorded in 39, in the first place.

The present invention utilizes any recognizable character as an initialization character such as an inverted "L" which is a right angle having legs ranging $\frac{1}{4}$" in length. Initialization character 17 is made by the writing implement in a defined position within the work space 3, for instance, at the left margin for each line of writing paper 3.

It is important to note that the reserved inverted "L" initialization character is chosen for illustration purposes only; and any type of suitable initialization character may be utilized, as long as it is not confused with any other letter or pattern that is to be stored in 39.

In a preferred embodiment of the present invention, software within circuit 30, for example, in recorder 39, has the capacity to identify the initializing character, for example, by comparing the pattern corresponding to the acceleration signals to known patterns in a look-up table, in particular, the known pattern of the initialization character. Once the initialization character is identified, this signals the recording operation to begin. In this way, only patterns which are needed to be recorded are recorded. As will be explained in greater detail later, further savings of storage capacity and of power is achieved by having the signal processing of circuit 30 only operate when pressure sensor 10 has signaled pressure detecting circuit 16 that the writing tip is near the writing surface. This avoids undesired recording of ambiguous patterns which are generated as the writing implement is moved through space, for example, as the user removes the implement from a shirtpocket to begin the writing operation. Otherwise, all of these accelerations would also be sensed and stored even though they have nothing to do with the pattern, marking, cutting, gouging or other operation which the user intends. Accordingly thus, signal processing only begins when pressure sensor or proximity sensor 10 is activated, and recording only begins when the reserved initialization character is sensed.

FIG. 7 illustrates one embodiment of the present invention in which a time delay feature is used in conjunction with the pressure signal emitted by pressure sensor 10 to the pressure detecting circuit 16. Pressure detecting circuit 16 utilizes a time delay feature such that when the pressure signal has not been received for a period of time, for instance, one-third of a second, this information is transmitted to the A/D converter 38, recorded by recording chip 39, for alerting the system to cease recording. The marked image will only be recorded and displayed on display 61 when initialization character 17 is again marked on writing surface 3 as shown in FIG. 7.

If the circuitry 30 is permanently connected for example by wire 52 to the receiver 60, then the displayed pattern on display 61 can also be interrupted if the time period has lapsed and no new contact has been made, as sensed by the pressure sensor 10. Very short duration interruptions of the pressure sensor are ignored and signal processing and storage is continued. Such very short duration interruptions may correspond to the short time it takes to lift tip 6 up from the page and then place it down again, as one word is finished and another is begun in the same line of writing. This time duration (for example, less than $\frac{1}{3}$ second) is accepted to avoid having to reinitialize the recording sequence (by reexecuting the initializing character) between each word. If, however, contact is lost (as sensed by pressure sensor 10) for more than a preselected period of time, this is interpreted as the operation of lifting the writing tip from the page and either the cessation of writing, or movement of the implement to a new line of text. After this delay, a new initialization character must be made before recording is reinstituted. To avoid confusion as to when the implement is recording a pattern and when it is not recording a pattern, it may also be advantageous to provide a signal, such as an LED on the implement which can be viewed by the writer and turned on whenever recording is taking place, and turned off when no recording is taking place. This will avoid losing a pattern which the user had intended to record but which was not recorded either because the pressure sensor had been deactivated for too long a period of time, or because the initializing character had not been made or read properly.

FIG. 8 illustrates a second embodiment of the initialization character feature wherein initialization character 17 is utilized as a start character for signaling the system that the system should start recording and displaying the image that is written after the initialization character is marked on writing surface 3. A stop character 18, which can be the same symbol as the start character 17, is drawn or marked at the end of each marking, line entry, design, etc. for alerting the system to cease recording and displaying the marked image. The system will only begin recording and displaying the original image once the start character 17 is marked on writing surface 3 as shown in FIG. 8. Therefore, when the same symbol is used as both a start character 17 and a stop character 18, the system will only record and display the original marked image after the marking of every other character 17. Translating package 62 or on-board logic in recorder 39 automatically recognizes that every even numbered entry similar to stop character 18 means that the display or the recording is to be stopped.

FIG. 9 illustrates a third embodiment of the initialization character feature in which a stop character 19 is utilized which is a different symbol from the start character 17. Thus, the system will stop recording and displaying the originally marked image once the stop character 19 is marked on the writing surface 3. The recording and displaying is resumed upon entering start character 17 on surface 3.

The present invention allows for the reproduction through electronic signals of a person's signature which can be utilized for security purposes for applications associated with automatic teller machines, and various type credit cards. The present invention can also be used in combination with digitizers in order to transmit records in their entirety.

FIG. 2 illustrates a second embodiment of the writing implement utilizing a second accelerometer sensor 21 located near the top of the housing 5 which is operatively connected to the electronic signal processing circuit 30 by a wire for the transmission and recording of signals relating to the motion and movement of the top of the implement which is independent of the signals transmitted from the tip 6 of the implement. This allows for a more precise recording and display of the marking such as a person's signature in order to enhance security.

For example, during the formation of a pattern, for example, a signature, one individual may characteristically move the rear end of the writing implement in a certain fashion while another individual who is attempting to simulate the same signature or pattern, may be totally incapable of reproducing the characteristic overall movement of the implement. If patterns from the lower and upper sensors 20 and 21 are stored in recorder 30, and then later compared with the known authorized pattern for the signature, a forged signature is far more easy to detect and far more difficult to produce. FIG. 2 also illustrates a diverse version of the invention where rather than a writing ball 7, writing tip 6 is provided with a felt-tip 70. Felt-tip 70 can be used for example with a strain gage 100 which senses flexing of the felt-tip to act as the pressure or proximity sensor.

As a further alternate embodiment of the present invention, a pressure sensor or proximity sensor can be replaced by an entry in the look-up table in recorder 39 which senses an abrupt change in acceleration in the Z-direction (along the axis of the implement) signaling the fact that the tip of the implement has struck the writing surface and is prepared to begin the formation of a pattern.

It is also here reemphasized that the present invention is not limited to writing but includes drawing, painting, and even the removal of material such as gouging, chiseling or cutting, and even to the simple tracing of a pre-existing pattern, for example, following a pre-existing pattern using a stylus to record the pattern. The present invention is also not limited to two-dimensional formations of patterns on a two-dimensional surface such as a writing surface, but may be used to trace or form three-dimensional surfaces such as the contour of a sculpture or other three-dimensional patterns.

The circuitry of the invention is also provided with a sleeper circuit which switches all signal processing off after an appropriate time delay to preserve battery life.

It is noted that the initialization character has direction and orientation information which is read by the logic circuits connected to the accelerometers or other sensing means for orienting the direction along which the pattern is to proceed (that is, the line of writing to follow the initialization character). For example, the inverted L has a vertical portion which is read to be perpendicular to the direction of orientation, and a horizontal portion which is read to be parallel to the orientation direction. Thus, two orientation components are provided. Since all accelerometers have an unavoidable limitation to accuracy which causes a drift as the pattern progresses, it has been found advantageous to provide a new initialization character which both initializes and orients the following pattern, before each line of writing. This minimizes the impact that the drift has on pattern recognition.

It is also noted that in addition to a plug-in, wire or radio link between the implement of the invention and a computer, an IR communication link can be utilized.

While specific embodiments of the invention have been shown and described in detail to illustrate the application of the principles of the invention, it will be understood that the invention may be embodied otherwise without departing from such principles.

What is claimed:

1. An arrangement for recording a pattern of hand movement in at least two perpendicular directions in a plane, comprising:
   a hand-held housing having a tip for movement along the pattern;
   sensing means in the housing for detecting directions and distances of movement of the tip in the at least two perpendicular directions in the plane containing the pattern, the sensing means generating a signal corresponding to the directions and distances;
   signal processing means in the housing and connected to the sensing means for receiving the signal and for detecting an initialization character corresponding to a preselected combination of directions and distances of movement for the tip;
   storage means connected to the signal processing means for storing directions and distances of movement of the tip as the pattern, but only after detection by the signal processing means of the initialization character; and
   connection means connected to the storage means and connectable to a computer spaced from the housing, for receiving the pattern.

2. An arrangement according to claim 1, wherein the storage means comprises a memory in the housing.

3. An arrangement according to claim 2, including proximity means connected to the signal processing means for detecting when the tip is near the plane, the proximity means operating the signal processing means to begin sensing the signal to locate the initialization character.

4. An arrangement according to claim 1, wherein the tip comprises a marking tip for marking the pattern on the plane.

5. An arrangement according to claim 1, wherein the sensing means comprises at least two accelerometers active in the two perpendicular directions respectively, for generating the signal.

6. An arrangement according to claim 5, wherein the storage means comprises a memory in the housing, the arrangement including proximity means for detecting when the tip is near the plane and connected to the signal processing means for operating the signal processing means to begin searching the signal for the initialization character.

7. An arrangement according to claim 1, wherein the signal comprises an analog signal, the signal processing means including an analog-to-digital converter for converting the analog signal to a digital signal before it is supplied to the storage means.

8. An arrangement according to claim 7, including a look-up table for containing distance and direction signals corresponding to the initialization character, the look-up table being operatively connected to the signal processing means for detecting the initialization character.

9. An arrangement according to claim 1, wherein the housing comprises an elongated marking implement, the tip being at one end of the implement, the sensing means being adjacent the tip.

10. An arrangement according to claim 9, including second sensing means connected to the signal processing means and located at an end of the implement opposite from the tip for providing additional direction and distance signals forming part of the pattern.

11. An arrangement according to claim 1, wherein the connection means comprises means for detachably attaching the storage means to a computer.

12. An arrangement according to claim 1, wherein the connection means comprises a wire for connecting the storage means to a computer.

13. An arrangement according to claim 1, wherein the connection means comprises a radio link for connecting a storage means to a computer.

14. An arrangement according to claim 1, wherein the housing includes marking means at the tip for marking the plane, the marking means being selected from the group consisting of a ball pen, a felt pen, a pencil, a brush, a crayon, a stylus, a gouge, a chisel, and a fountain pen.

15. A method for recording a pattern of hand movement in at least two perpendicular directions in a plane containing the pattern, comprising:
   providing a hand-held implement having a tip for movement along the pattern;
   sensing movement of the tip in directions and along distances in the at least two perpendicular directions;
   continuously monitoring the directions and distances to locate an initialization character;
   upon locating the initialization character, storing subsequent directions and distances as the pattern; and
   interconnecting the stored pattern with a computer.

16. A method according to claim 15, including beginning the sensing of the directions and distances only when the tip is proximal to the plane.

17. A method according to claim 15, including using the tip to mark the pattern on the plane while the pattern is being stored.

18. A method according to claim 15, including switching off all signal processing if no direction or distance has been sensed for a selected period of time.

19. An arrangement according to claim 1, wherein the initialization character includes at least one direction orientation component, the signal processing means being capable of reading the orientation direction component for orienting the sensing means signals along the pattern.

20. A method according to claim 15, wherein the initialization character includes at least one orientation direction component, the method including reading the orientation direction component to orient the sensing of the movement of the tip along the pattern of hand movement.

* * * * *